(12) United States Patent
Boscher

(10) Patent No.: US 9,868,379 B2
(45) Date of Patent: Jan. 16, 2018

(54) DEVICE FOR LOADING AND UNLOADING BOXES ON TO AND FROM A VAN

(71) Applicant: Gruau Laval, Saint-Berthevin (FR)

(72) Inventor: David Boscher, La Guerche de Bretagne (FR)

(73) Assignee: GRUAU LAVAL, Saint-Berthevin (FR)

(*) Notice: Subject to any disclaimer, the term of this patent is extended or adjusted under 35 U.S.C. 154(b) by 0 days.

(21) Appl. No.: 15/319,583

(22) PCT Filed: Jun. 17, 2015

(86) PCT No.: PCT/FR2015/051600
§ 371 (c)(1),
(2) Date: Dec. 16, 2016

(87) PCT Pub. No.: WO2015/193613
PCT Pub. Date: Dec. 23, 2015

(65) Prior Publication Data
US 2017/0129379 A1     May 11, 2017

(30) Foreign Application Priority Data
Jun. 17, 2014   (FR) ...................... 14 55562

(51) Int. Cl.
*B60P 1/43*     (2006.01)
*B65G 69/30*    (2006.01)
(Continued)

(52) U.S. Cl.
CPC ............... *B60P 1/436* (2013.01); *B60P 1/649* (2013.01); *B60P 7/08* (2013.01); *B65G 69/30* (2013.01)

(58) Field of Classification Search
CPC .. B60P 1/436; B60P 1/649; B60P 1/52; B60P 1/64; B60P 7/08; B60P 7/135
See application file for complete search history.

(56) References Cited

U.S. PATENT DOCUMENTS

| | | | |
|---|---|---|---|
| 2,678,139 A | * | 5/1954 | Gildersleeve ............. B60P 1/52 |
| | | | 105/355 |
| 3,333,715 A | | 8/1967 | Hepburn |

(Continued)

FOREIGN PATENT DOCUMENTS

| | | |
|---|---|---|
| DE | 4335478 A1 | 4/1995 |
| DE | 29802774 U1 | 5/1998 |

(Continued)

OTHER PUBLICATIONS

International Preliminary Report on Patentability and English translation of the Written Opinion of the International Searching Authority dated Dec. 20, 2016 for corresponding International Application No. PCT/FR2015/051600, filed Jun. 17, 2015.

(Continued)

*Primary Examiner* — Kaitlin Joerger
(74) *Attorney, Agent, or Firm* — David D. Brush; Westman, Champlin & Koehler, P.A.

(57) ABSTRACT

A vehicle for transporting boxes in a loading volume, the boxes being stacked on at least one trolley with wheels, engaging with at least one guide rail attached to the floor to guide the movement of said trolley. The vehicle has at least one device exerting a horizontal force on a row of boxes placed on at least one trolley to move them towards an opening of the vehicle. The vehicle furthermore has at least one roof bar holding, at the upper portion, at least one stack of boxes placed on a trolley. The presence of a roof bar ensures that the boxes are properly held in the loading volume, thus preventing breakage during transportation.

12 Claims, 8 Drawing Sheets

Figure 1:
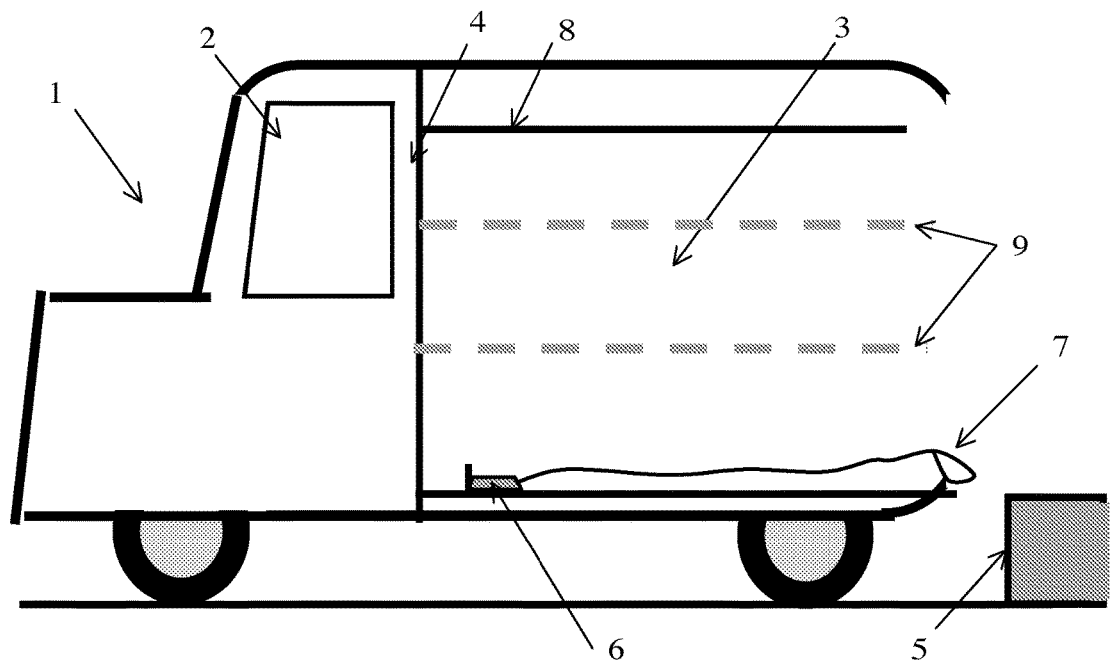

(51) Int. Cl.
*B60P 1/64* (2006.01)
*B60P 7/08* (2006.01)

(56) References Cited

U.S. PATENT DOCUMENTS

| | | | |
|---|---|---|---|
| 3,722,717 A | 3/1973 | Stryczek | |
| 3,853,230 A * | 12/1974 | Schultz | B60P 1/52 414/392 |
| 3,998,343 A | 12/1976 | Fors | |
| 4,009,792 A * | 3/1977 | Sano | B60P 1/52 414/499 |
| 4,056,066 A | 11/1977 | Homanick | |
| 4,111,318 A | 9/1978 | Lutz | |
| 4,231,695 A * | 11/1980 | Weston, Sr. | B60P 1/52 277/590 |
| 5,054,295 A | 10/1991 | Goulooze | |
| 5,163,806 A * | 11/1992 | Robertson | B60P 1/52 244/137.1 |
| 5,306,064 A * | 4/1994 | Padovano | B60P 7/08 108/158 |
| 6,299,184 B1 * | 10/2001 | Krawczyk | B60P 3/055 280/651 |
| 9,056,577 B2 * | 6/2015 | Corrigan | B60P 1/38 |
| 9,079,665 B2 * | 7/2015 | Larson | B60P 7/08 |
| 9,708,119 B2 * | 7/2017 | DiSorbo | B60P 1/36 |
| 2008/0019813 A1 | 1/2008 | Lavely | |

FOREIGN PATENT DOCUMENTS

| | | |
|---|---|---|
| FR | 2344420 A1 | 10/1977 |
| FR | 2483340 A1 | 12/1981 |
| FR | 2752404 A1 | 2/1998 |
| JP | S5953240 A | 3/1984 |

OTHER PUBLICATIONS

French Search Report and Written Opinion dated Mar. 9, 2015 for corresponding French Application No. 1455562, filed Jun. 17, 2014.
International Search Report dated Aug. 28, 2016 for corresponding International Application No. PCT/FR2015/051600, filed Jun. 17, 2015.
Written Opinion of the International Searching Authority dated Aug. 28, 2016 for corresponding International Application No. PCT/FR2015/051600, filed Jun. 17, 2015.

* cited by examiner

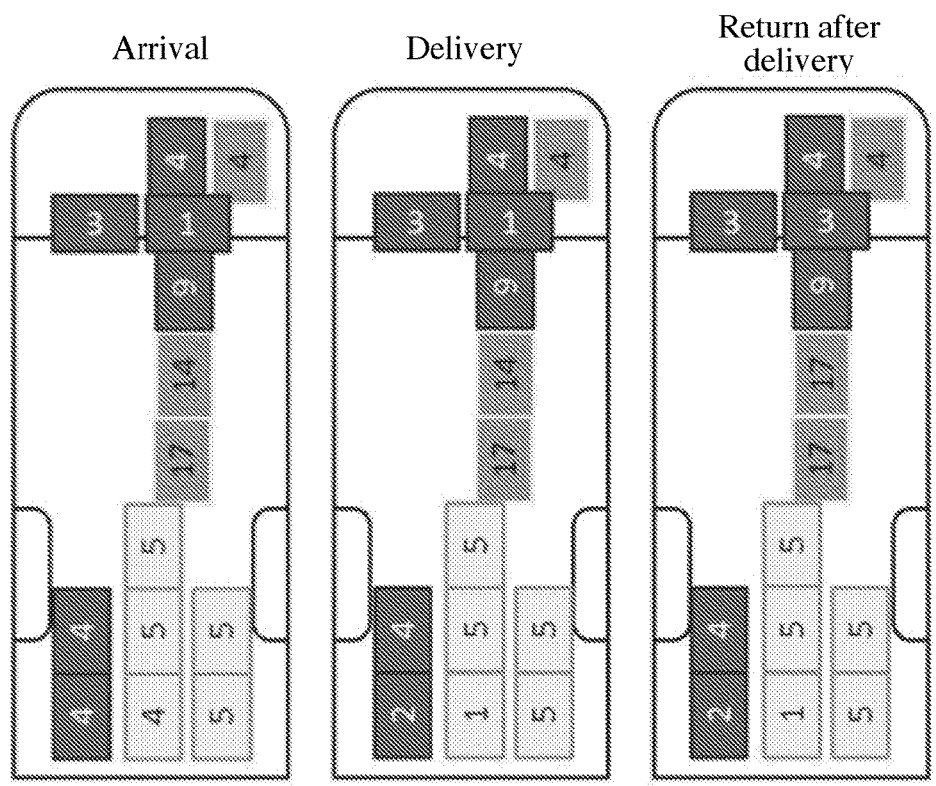
Fig. 10.e
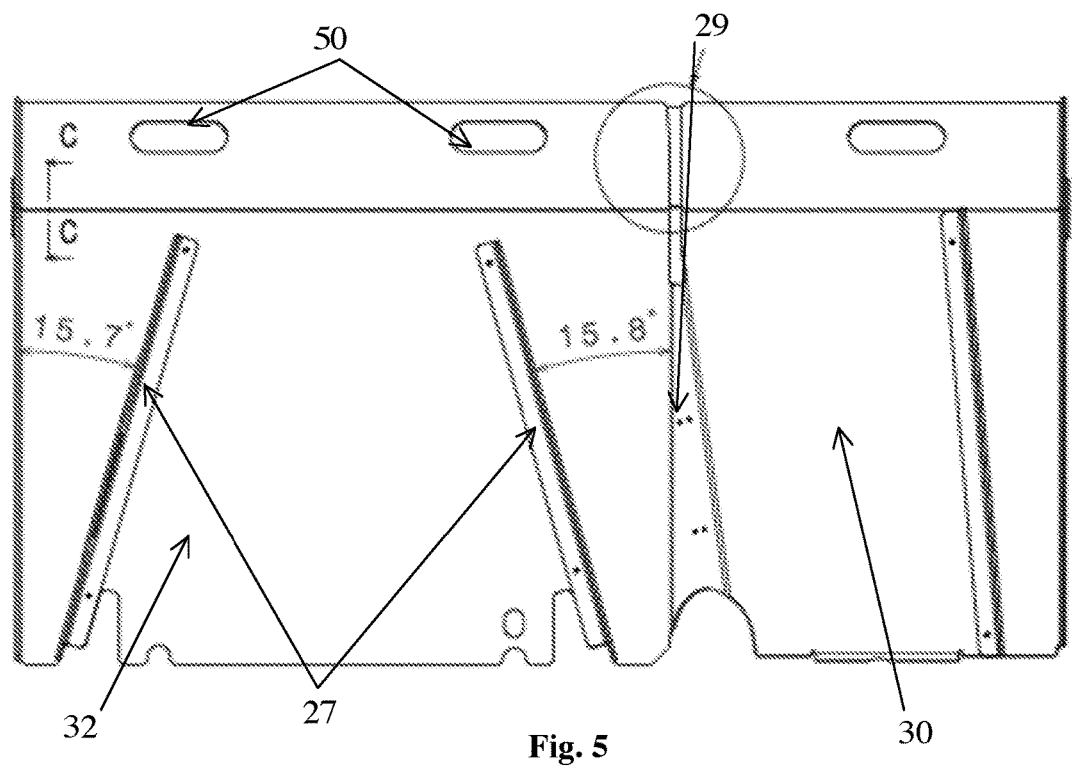
Fig. 5

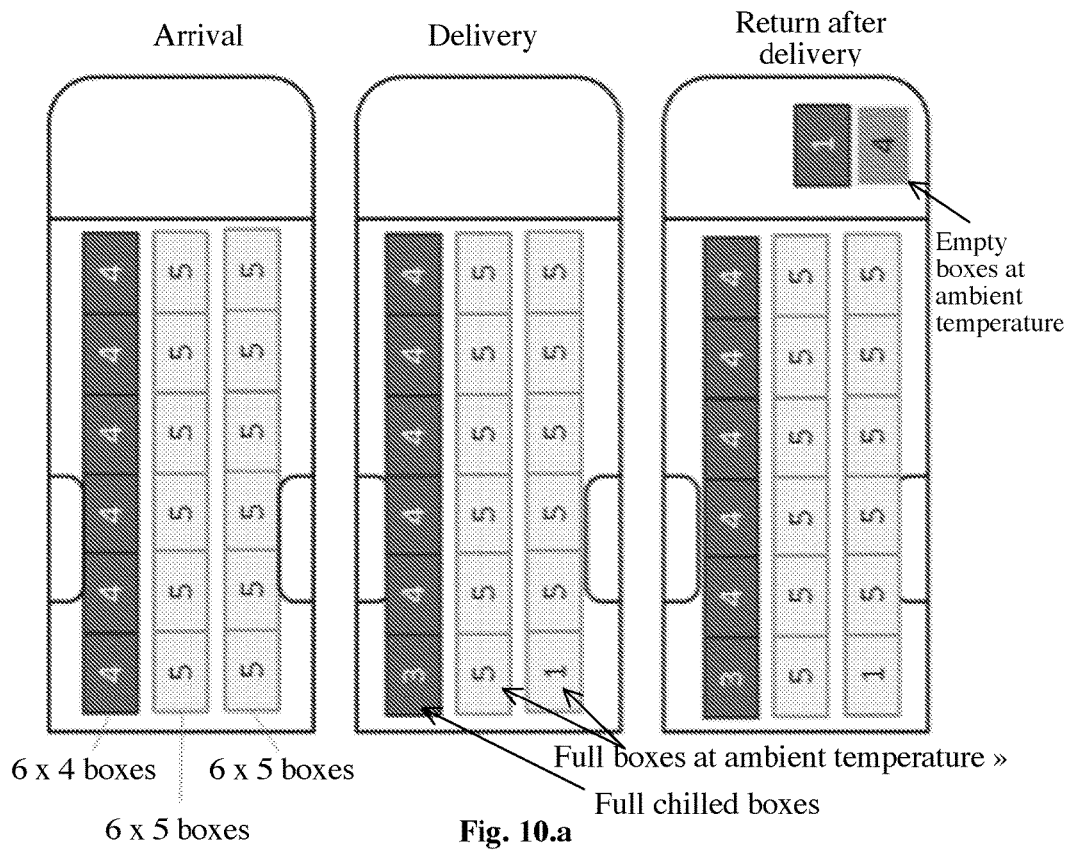
Fig. 10.a
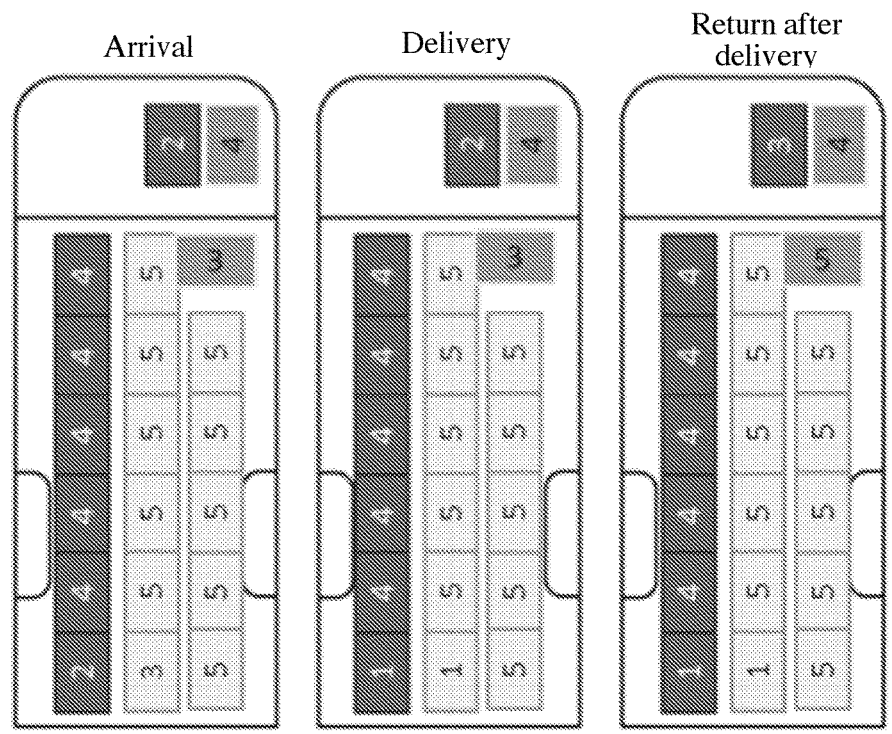
Fig. 10.b

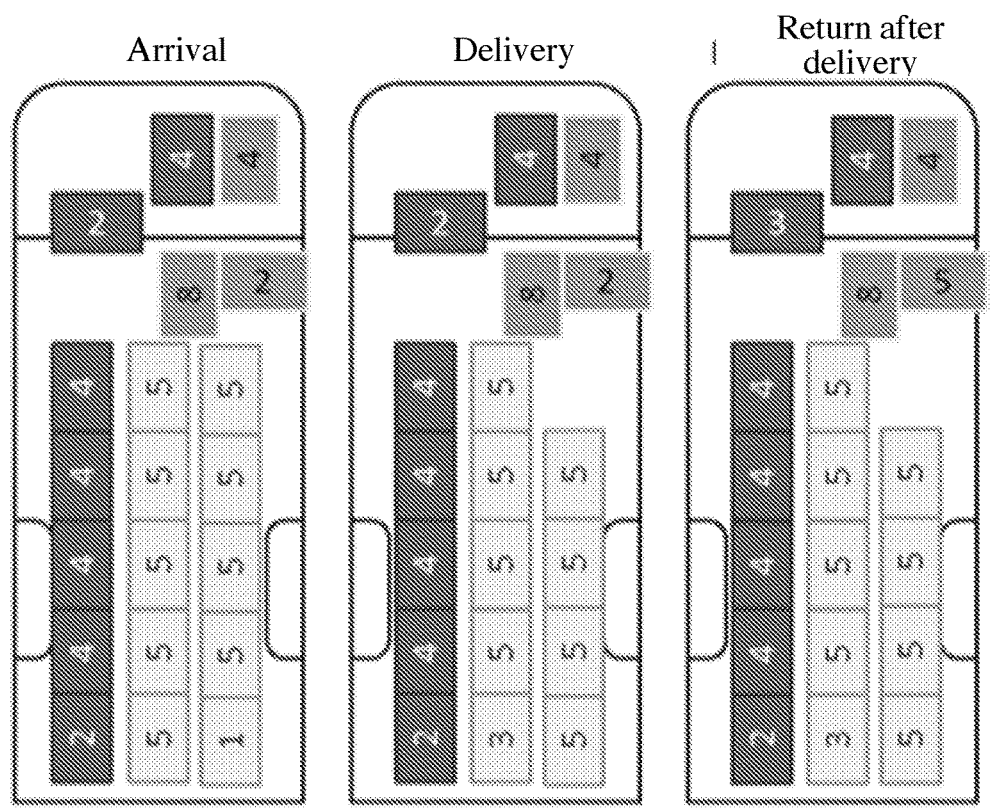
Fig. 10.c
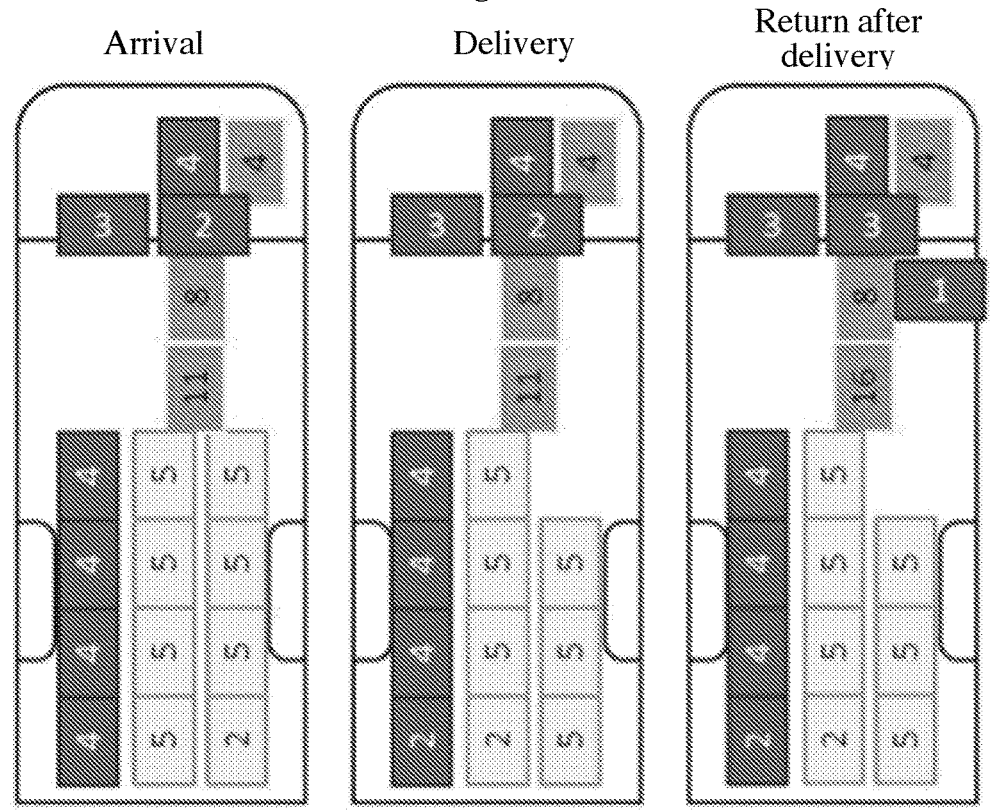
Fig. 10.d

DEVICE FOR LOADING AND UNLOADING BOXES ON TO AND FROM A VAN

1. CROSS-REFERENCE TO RELATED APPLICATIONS

This Application is a Section 371 National Stage Application of International Application No. PCT/FR2015/051600, filed Jun. 17, 2015, which is incorporated by reference in its entirety and published as WO 2015/193613 on Dec. 23, 2015, not in English.

2. FIELD OF THE INVENTION

The invention relates to a device for loading and unloading boxes onto and from a van. The invention can be applied especially when the boxes are to be delivered to a home by a delivery man.

3. PRIOR ART

There are many types of commercial or utility vehicles for transporting goods. These vehicles have a driving cabin and a loading volume. This loading volume is accessed from the side, generally through a sliding door, or by the rear. The loading volume can be accessed by a roll-up door or one or more pivoting doors, either from the rear or from the side. In general, the internal width of the door is almost equal to the width of the interior of the loading volume. Thus, bulky parcels can be loaded by means of a forklift that lifts these parcels to the height of the floor. The delivery man then pushes the parcel into the loading volume starting with the far end i.e. the end closest to the cabin. To facilitate the operation, trolleys are sometimes used to load the vehicle from a warehouse loading bay.

Isothermal vehicles are used to transport fresh and/or chilled products. To this end, certain commercial vehicles are provided with numerous compartments used to transport foodstuffs at different temperatures. In this case, specific compartments closed by isothermal doors are made in the loading volume. Generally, low-temperature compartments for the transportation of deep-frozen foods are small-capacity compartments. The loading volume directly accessible through the external door can be maintained at a chilled temperature for the transportation of vegetables and fruits for example.

In such vehicles, it is important to leave the door open for as short a time as possible so as not to modify the internal temperature. To this end, the load is prepared on the loading dock and the vehicle is brought to the immediate proximity of this loading dock so that a delivery man can transport groups of packages using a forklift, trolleys or pallets on wheels. The loading dock is prepared so as to be almost at the same height as the floor of the vehicle. In one variant, the floor of the vehicle has rollers disposed crosswise to the vehicle. A delivery man brings the opening of the vehicle in proximity to the loading dock and pushes the packages onto the rollers. In any case, the loading can be done by pushing all the packages from the bay towards the loading volume.

To facilitate delivery and limit the time for which the external door is open, the packages to be delivered last are the ones placed against the cabin and those to be delivered first are placed last, next to the door. The first packages can be easily picked up by the delivery man from the outside of the vehicle. However, the last packages have to be got from far end and the delivery man therefore has to enter the loading volume. During delivery, the delivery man is not on a dock or bay and is often in front of an individual home. He therefore has to straddle the height between the ground and the floor of the vehicle, and once he is inside the vehicle, he has to move the package from the far end towards the door, get down from the vehicle and pick up the packages one by one to place them on a mobile trolley and take them to their addressees. These operations are lengthy, repetitive and disturb the temperature which has to remain constant in the loading volume. In addition, these handling operations cause physical fatigue and may give rise to muscular and skeletal disorders.

In addition, if the packages are not properly secured, they may move and fall all over the vehicle and cause breakage to products. When the stacks of packages are removed as and when the deliveries are made, free space opens up and the packages can roll about during transportation if they are not properly tied in place. For home delivery, the time is very limited and the delivery men do not always have time to tie the packages. This is why packages are often broken.

The present invention proposes a device to facilitate the unloading of packages from a commercial vehicle by reducing the muscular effort exerted by a delivery man while at the same time reducing the unloading time. In addition, the present invention also enables the boxes to be secured during transportation.

4. SUMMARY OF THE INVENTION

To this end, the invention relates to a vehicle for transporting boxes in a loading volume, said boxes being stacked on at least one trolley with wheels, engaging with at least one guide rail attached to the floor to guide the movement of said trolley, the vehicle comprising at least one device exerting a horizontal force on a row of boxes placed on at least one trolley to move them towards an opening of the vehicle. The vehicle furthermore comprises at least one roof bar holding, at the upper portion, at least one stack of boxes placed on a trolley.

The unloading from the loading volume is thus facilitated, and delivery is speedy and requires less physical effort on the part of the delivery man. In addition, the structure ensures that the boxes are properly held in the loading volume, thus preventing breakage during transportation.

According to a first embodiment, the roof bar is designed to block a stack of empty boxes nested within one another, the distance between the floor of the vehicle and said roof bar being slightly greater than the sum of the heights of a trolley and a determined number of empty boxes nested into one another.

According to another embodiment, the roof bar is designed to block a stack of boxes placed on top of one another with the lid closed, the distance between the floor of the vehicle and said roof bar being slightly greater than the sum of the heights of a trolley and a determined number of boxes placed on top of one another with the lid closed.

According to another embodiment, the vehicle comprises at least one anti-roll or stabilizer bar attached horizontally on the length of at least one internal wall of the loading volume, the boxes having at least one longitudinal sill extending on the side and on top, the stabilizer bar hooking onto said sill from the top.

According to another embodiment, the stabilizer bar hooks the boxes placed on top of one another with the closed lid, the height of the stabilizer or stabilizer bar being situated at a height equal to the sum of the heights of a trolley and a determined number of boxes placed on top of one another with the lid closed.

According to another embodiment, the device exerting a horizontal force on a row of boxes placed on at least one trolley is a mobile stop device or stopper sliding in a guide rail attached to the floor of the loading volume and coming into contact with a trolley or a box placed on it, said mobile stopper moving by means of a strap towards the opening of the vehicle.

According to another embodiment, the vehicle comprises elements for blocking said strap in proximity to the opening so that the strap is kept under tension along a direction longitudinal to the vehicle when said mobile stopper comes into contact with a trolley or a box placed on it which itself abuts against a fixed stopper present in proximity to the opening of the vehicle.

According to another embodiment, the loading volume comprises at least two guide rails to guide the wheels either to the left or to the right of two rows of trolleys.

According to another embodiment, the vehicle comprises an access ramp placed in the rear of the vehicle in order to extend the vehicle floor up to the loading bay, said access ramp comprising straight elements extending the guide rails present in the loading volume.

According to another embodiment, the loading volume comprises two parts having floors at different heights, said access ramp being constituted by two platforms, each getting placed on each floor of the two parts of the loading bay and getting extended to get placed on the loading bay, the two platforms having different slopes to compensate for the difference in height between floors.

According to another embodiment, the vehicle comprises a compartment at ambient temperature containing a plurality of rows of boxes, one chilled compartment containing a single row of boxes, said chilled compartment having a height lower than the height of the compartment at ambient temperature, and a drawer placed on top of the chilled compartment, the contents of which are accessible by pulling the drawer towards the rear of the vehicle.

According to another aspect, the invention relates to a method for unloading a vehicle that is described in one of the above paragraphs and comprises a rear door giving access to the rear of the row of boxes and a lateral door giving access to the front of the rows of boxes. The method consists in unloading at least one stack of full boxes through the rear of the vehicle, moving at least one row of boxes towards the rear by at least the length of a stack and introducing the empty boxes through the side door to place them at the position thus released in front of the moved row.

According to another embodiment, the empty boxes are nested into one another, forming a stack having a number of boxes at least equal to twice the number of full boxes in a stack. The row of empty boxes is placed so that it straddles the guide rails of two rows of full boxes and the stacks of empty boxes are held by the roof bar.

5. LIST OF FIGURES

Figure 2:
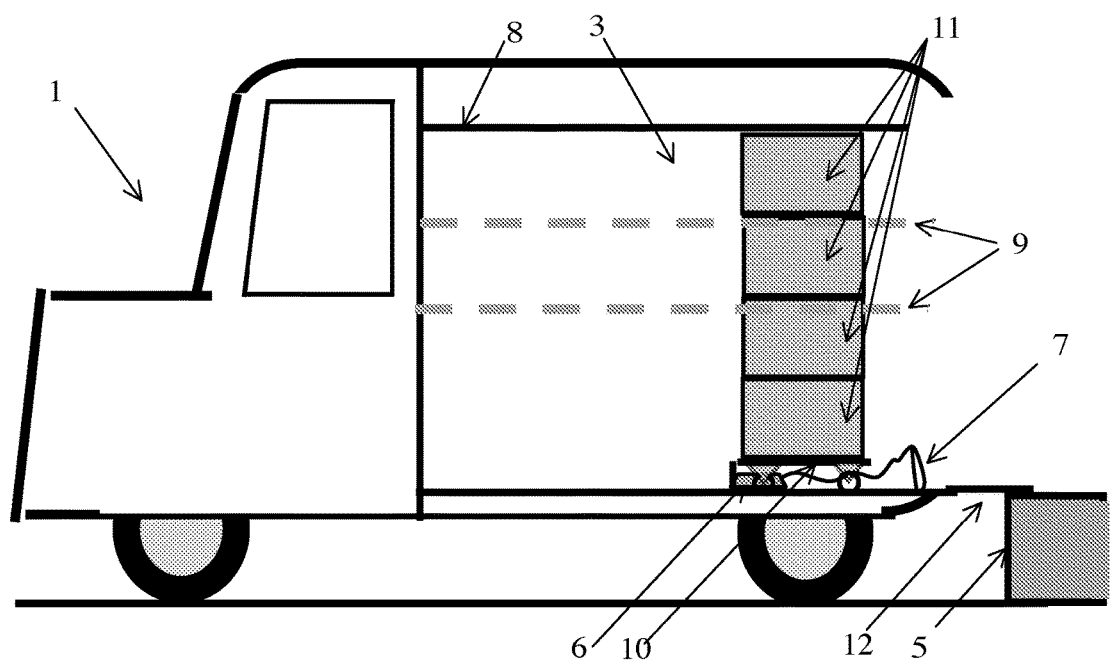
Figure 3:
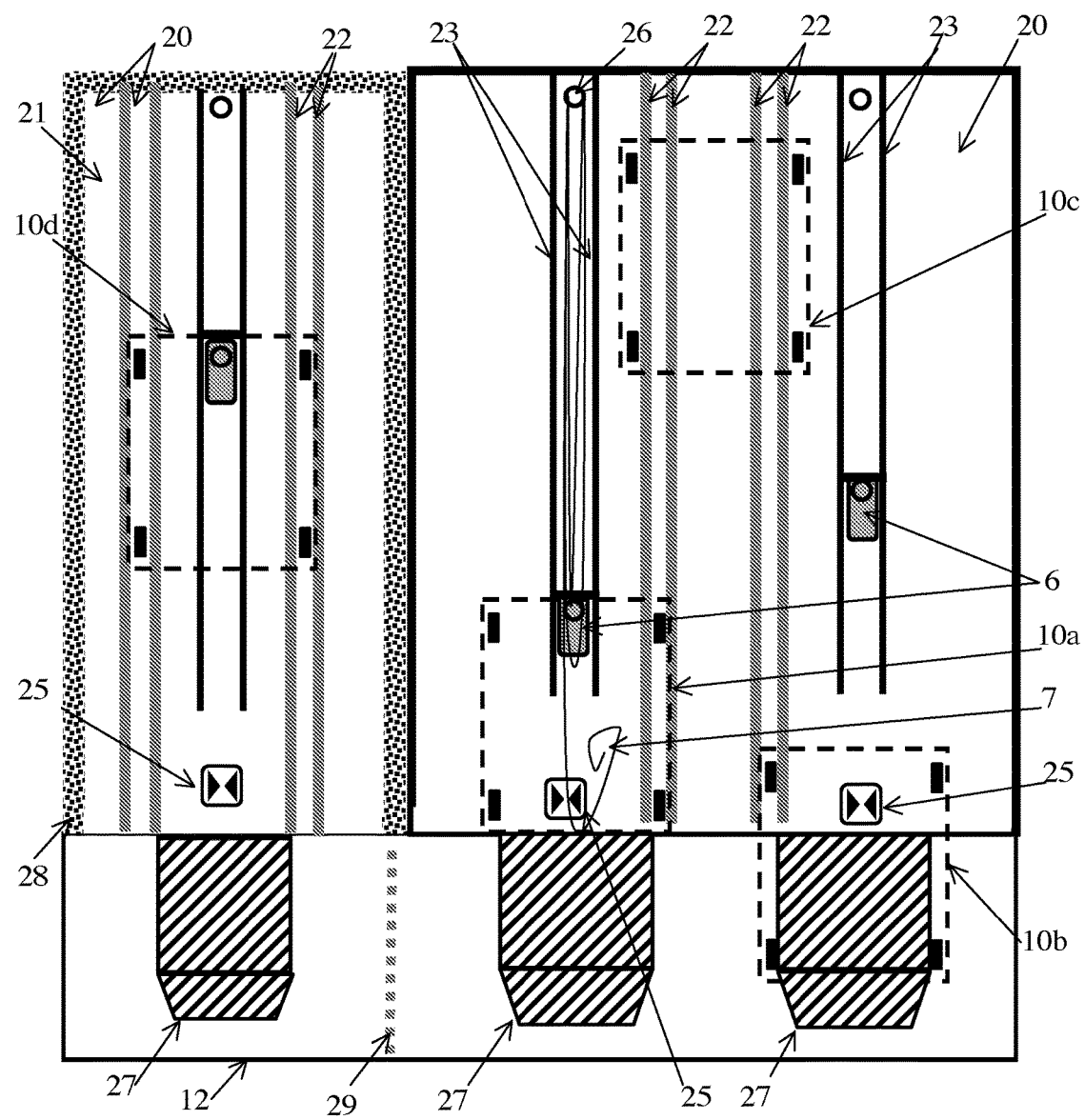
Figure 4:
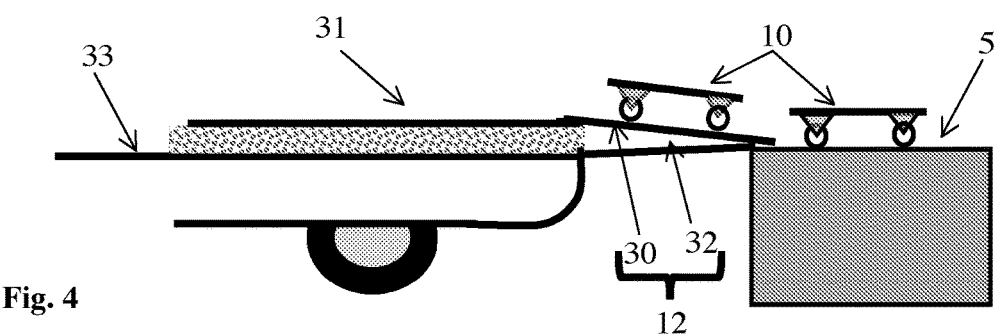
Figure 11:
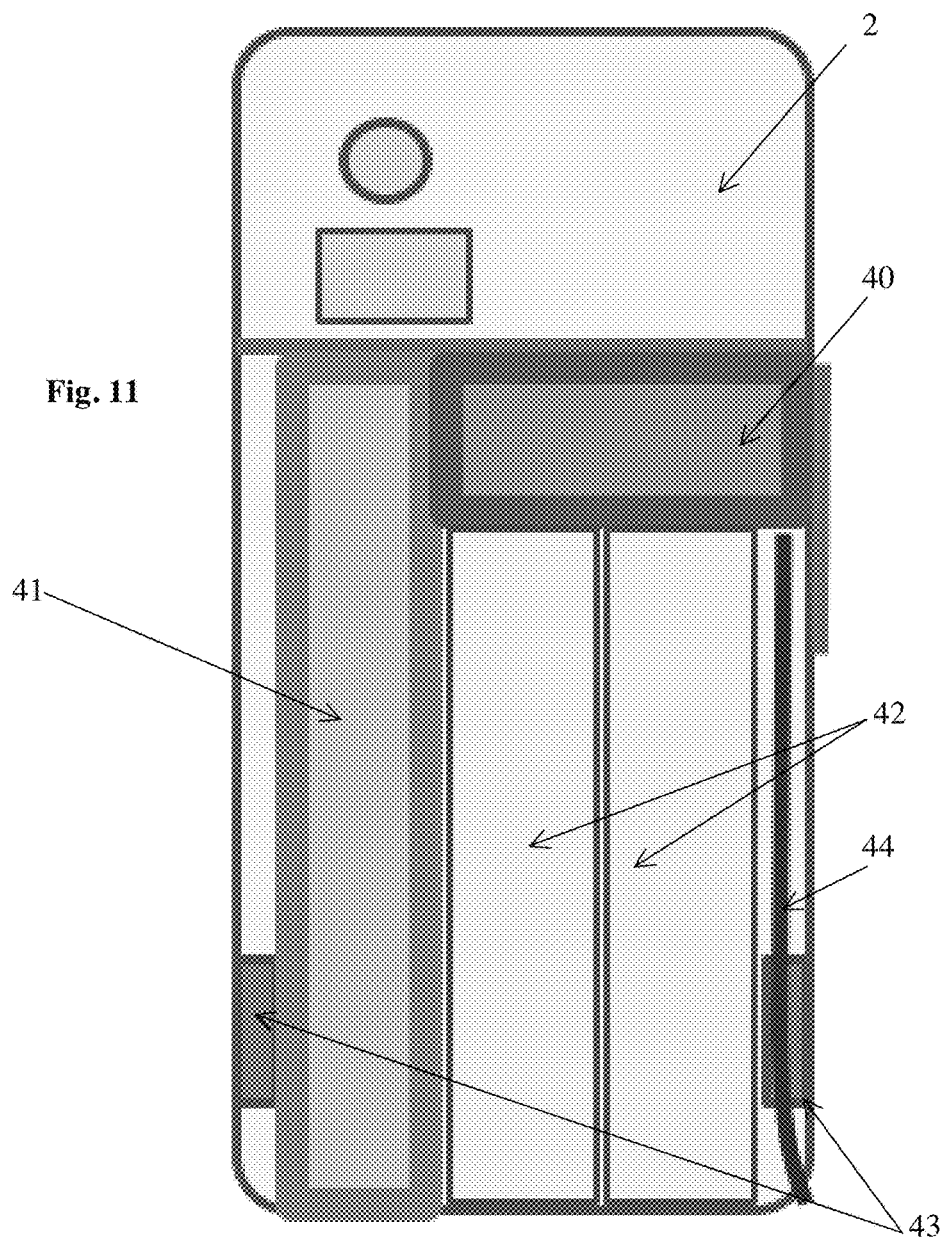
Figure 6:
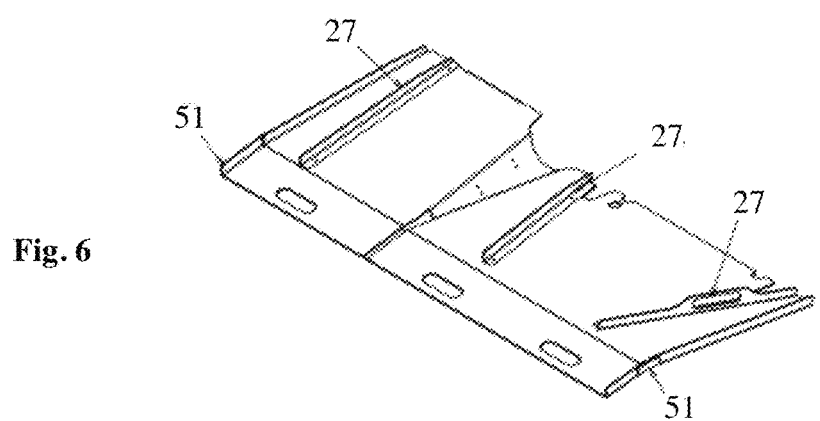
Figure 7:
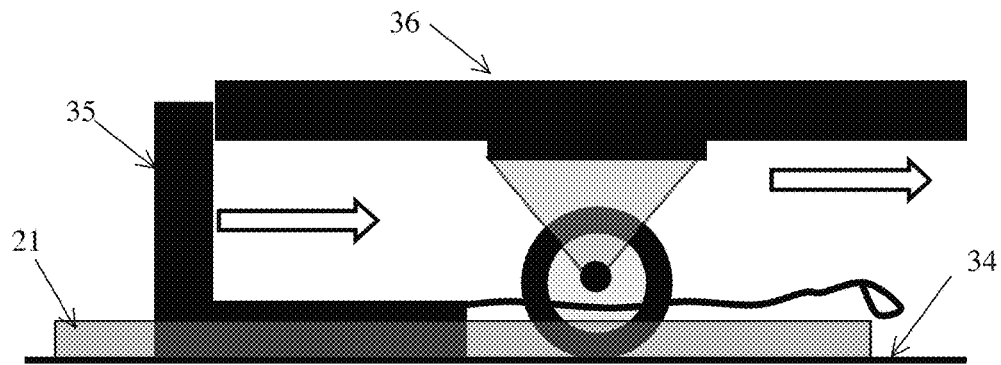
Figure 9:
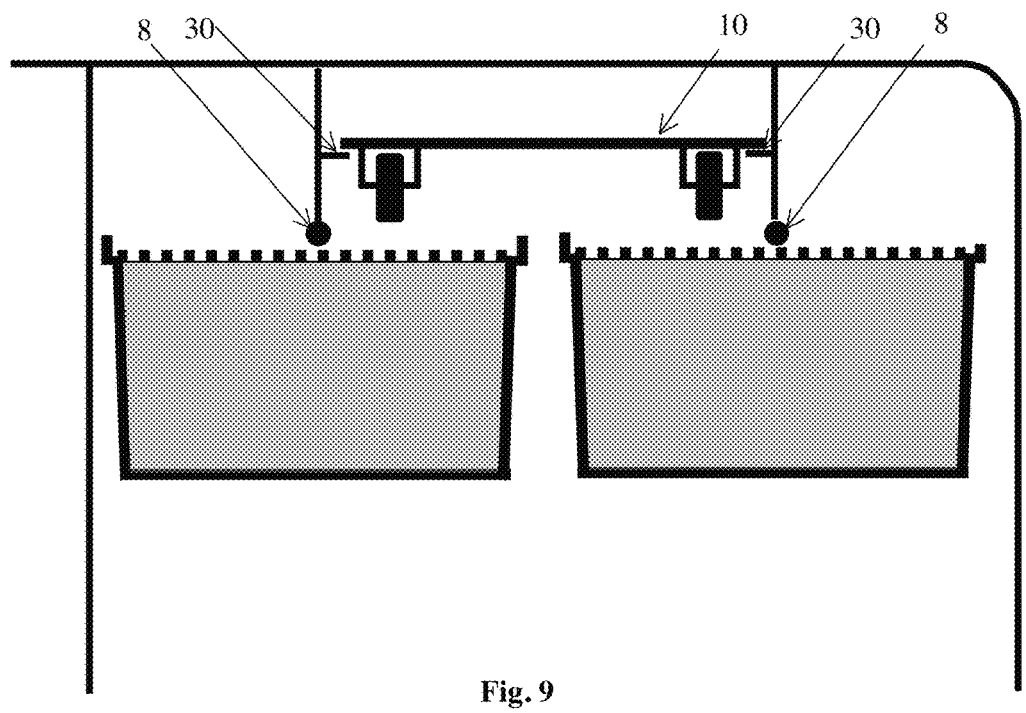
Figure 8:
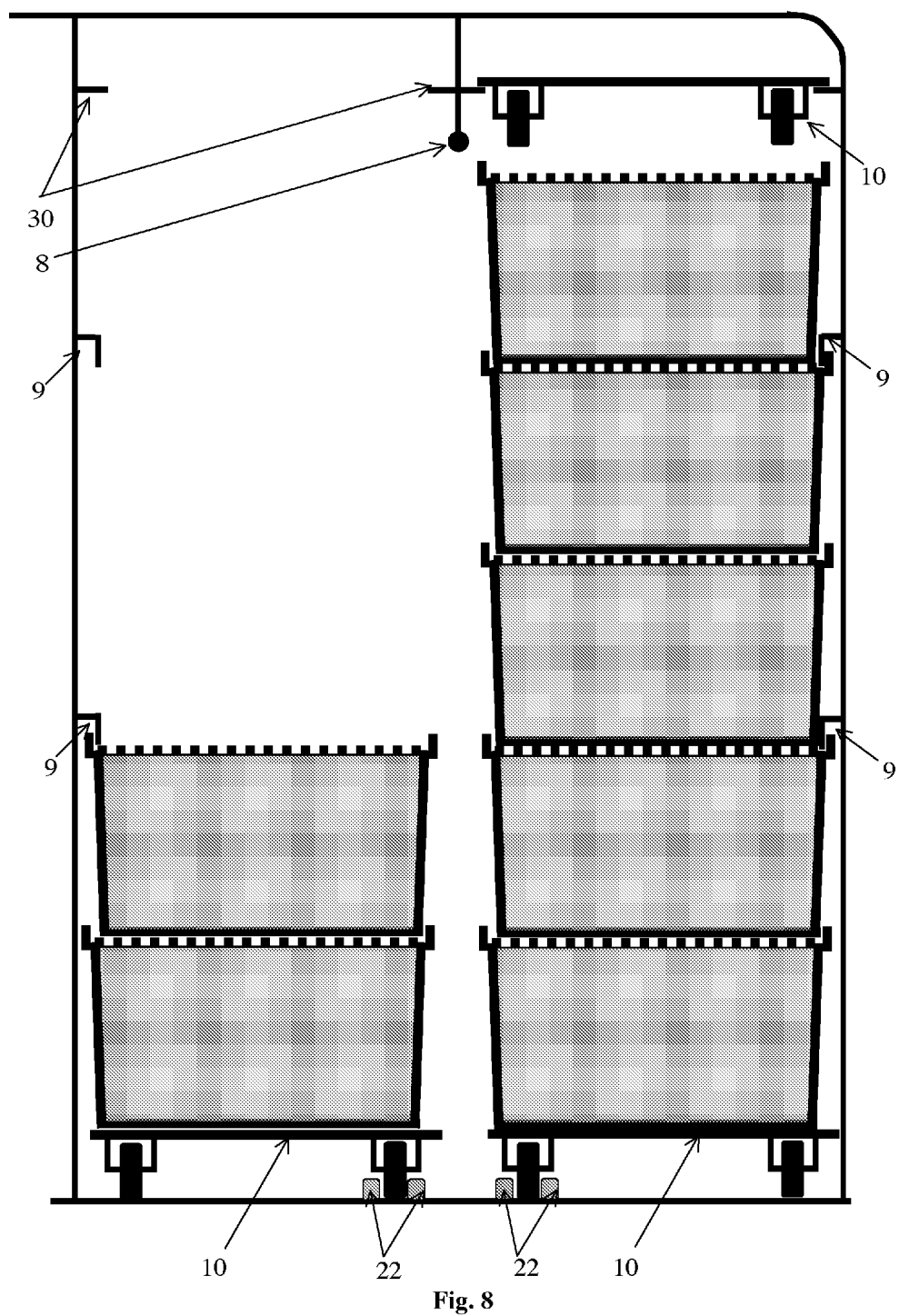

Other features and advantages of the invention shall now appear in greater detail in the following description of embodiments given by way of non-exhaustive illustrations with reference to the appended figures, of which:

FIG. 1 presents a drawing of a commercial vehicle seen in profile according to one embodiment, FIG. 2 shows a stack of boxes loaded in the rear of a commercial type vehicle according to one embodiment, FIG. 3 is a diagram of a loading volume seen from the top, showing the elements attached to the floor, FIG. 4 shows the details of a ramp seen in a profile view, said ramp being provided with a double slope, FIG. 5 shows the details of a ramp seen from the top according to one example of an embodiment, FIG. 6 shows the details of a ramp seen in a three-quarter view according to the same exemplary embodiment, FIG. 7 is a detailed view of the shuttle and its engaging with wheel-fitted trolleys, FIG. 8 shows the details of stabilizer bars and roof bars designed to block the boxes placed on the trolleys, FIG. 9 shows an alternative mode of implementing transportation bars and two roof bars, FIGS. 10.*a*, 10.*b*, 10.*c* 10.*d* and 10.*e* describe the contents of a vehicle being unloaded, illustrating the steps of an unloading procedure, FIG. 11 shows the organization of the different compartments of the loading volume according to one embodiment.

6. DESCRIPTION OF ONE EMBODIMENT OF THE INVENTION

6.1 General Principal

The invention relates to a vehicle designed to transport boxes in a loading volume, said boxes being stacked on at least one trolley with wheels engaging with at least one guide rail attached to the floor to guide the movement of said trolley, the vehicle comprising at least one device exerting a horizontal force on a row of boxes placed on at least one trolley to move the boxes towards an opening of the vehicle. The vehicle furthermore comprises at least one roof bar maintaining, at its upper part, at least one stack of boxes placed on a trolley. The presence of a roof bar ensures that the boxes are properly held in the loading volume, thus preventing breakage during transportation.

6.2 Description of One Embodiment

FIG. 1 is a diagram of a commercial vehicle, seen in a side view, used to make frequent deliveries, in one exemplary embodiment of the invention. Generally, the vehicle comprises a cabin 2 and a loading volume 3 designed to receive boxes, this volume having a parallelepiped shape. The cabin 2 and the loading volume 3 are separated by a wall 4. The boxes can be boxes of foodstuffs for which the cold chain must be maintained. To this end, the commercial vehicle is equipped with at least one thermally isolated compartment. If the load comprises boxes to be kept at different temperatures, the vehicle can be equipped with three types of compartments, for example: one compartment at room temperature, another compartment kept at chilled temperature (2-4° C.) and a third compartment kept at deep-freeze temperature (−20° C.), the latter two temperatures being maintained in small volumes closed by isothermal doors.

According to the invention, a delivery man reverses the vehicle up to the immediate proximity of a boarding and/or delivery bay or dock 5, and pushes the boxes stacked on wheel-fitted trolleys from the bay or dock into the vehicle. Such a trolley consists of a rectangular deck surmounted by wheels mounted so as to be pivoting on an axis and called a swiveling or "loose" rollers. A sliding stopper called a "shuttle" pre-positioned in the rear of the vehicle slides between two guide rails provided for this purpose. This shuttle schematically takes the form of an L-shaped part, the horizontal arm of the L shape being held between two guide rails and the vertical arm of the L shape which extends above the guide rails abutting the tray of a wheel-based trolley or a box placed on it. A strap 7 is attached to the shuttle to enable a delivery man to bring it towards the rear opening of the vehicle.

According to the invention, at least one horizontal bar 8 called a roof bar is attached to the roof of the vehicle in its interior. This roof bar holds the boxes placed on top of the stacks and prevents them from tipping over during transportation. The height of the roof bar 8 is computed so that a maximum number of stacked boxes pass beneath this bar and brush against it. The space between the top of the highest box and the lower face of the bar 8 is the order of 1 cm. The roof bar is positioned so as to be vertical to the segment intersecting the middle of the box situated beneath, the positioning of this box being ensured by a guide means present at the floor of the loading volume. The boxes are stacked on top of one another on a trolley and the stacks are aligned and loaded by the rear of the vehicle. If the loading volume comprises more than one row of boxes accessible from the opening, then an equal number of bars 8 can be attached to the roof. According to another improvement, to improve the stability of the boxes during transportation, the stacks are held by a plurality of stabilizer bars 9 placed on lateral partitions, to the left and to the right of the loading volume 3. Advantageously, the roof bar does not cover the entire length of the loading volume. At one place, the length of which is approximately equal to that of a box, the bar is interrupted, enabling the delivery man to tilt the stack of boxes and to remove them easily. If a stack has to be placed at this position, then the boxes are held by classic anchoring or tying means. In being pushed, the boxes leave this place and get positioned beneath the roof bar.

FIG. 2 shows a stack of boxes 11 loaded in the rear of a commercial type vehicle, the boxes being placed on wheel-fitted trolleys 10 and loaded by the rear opening of the vehicle. A minimum distance is left between the rear of the vehicle 1 and the edge of the loading dock 5. The delivery man positions a boarding ramp 12 to extend the floor of the loading volume 3 up to the platform. This ramp which shall be seen in greater detail here below is a substantially flat plate which gets stowed in a space prepared between the stabilizer bars 9 and the wall of the vehicle. The ramp extends the guide pathways present in the vehicle to make them exit by the rear. In this way, a delivery man can prepare the loading on the bay by stacking a certain number of boxes 11 on wheel-based trolleys up to a maximum height, typically 1.80 meters, this height being defined by the internal dimensions of the vehicle. If a single trolley does not suffice, the delivery man can stack the boxes 11 on several trolleys to form rows, for example, two rows of four wheel-fitted trolleys each supporting five boxes.

When a stack of boxes in the vehicle is pushed, the wheel-fitted trolley comes into contact with the vertical arm of the shuttle and pushes it towards the front of the vehicle. When the delivery man wishes to unload the boxes through the rear opening of the vehicle, all he needs to do is to pull on the strap 7 to bring it towards the rear of the shuttle and the stack of boxes.

FIG. 3 presents a diagram of a loading volume seen from the top, in showing the elements attached to the floor. According to one embodiment, the loading volume comprises a compartment 20, called an "ambient-temperature" compartment that is to contain two rows of boxes stacked on trolleys and another compartment 21 called a "chilled" compartment containing a single row of boxes placed in a refrigerated environment. The closing of the compartments is done by closing the rear door of the vehicle (not shown). One of the two doors comprising an isolated panel thermally isolates the chilled compartment 21.

FIG. 3 shows four trolleys 10 disposed at different places. For the three rows, the wheels of the trolleys get engaged in a guide rail 22 formed by two rectilinear structural sections or profiles with a height of a few centimeters and extending over the length of the compartment. To the extent that the wheels are mounted so as to be pivoting on an axis, the guide rail 22 guides the trolleys 10 in a straight line and positions them precisely in the compartments of the loading volume 3. Advantageously, only one guide rail 22 is installed per row of trolleys in the ambient-temperature compartment. The side wheels, which do not move on rails, do not need to be guided. In this way, the compartment has a minimum number of elements on the ground, thus limiting obstacles and making it easier for a delivery man to move about, and lightening the structure thus increasing the loading capacity.

According to one example of an embodiment, the ambient-temperature compartment has two guide rails 22 associated with two rows of trolleys. If the vehicle is looked at from the rear, the guide rail situated to the left guides the right-hand wheels of the trolleys of the row to the left and the rails situated to the right guides the left-hand wheels of the trolleys of the row situated to the right. FIG. 3 shows the trolley 10a on the left hand row and the trolley 10b on the right hand row. The two rails can also guide trolleys forming a third row of trolleys that get positioned so as to straddle the first and second rows, the trolley 10c being positioned on this third row. The right-hand and left-hand wheels of the trolleys positioned on this third row abut against one of the rectilinear structural sections constituting the guide rails 22 of the right-hand and left-hand rows. Thus, the left-hand wheels are guided by the left-hand structural section of the guide rail of the left-hand row and the right-hand wheels are guided by the right-hand structural section of the guide rail of the right-hand row. Other dispositions are possible, for example, the one where the positioning of the rails enables the wheels of the trolleys of the third row to run in the rails 22 and not at the side. As shall be seen here below, this third row is meant to receive trolleys on which empty boxes are stacked.

Each row of trolleys has its shuttle 6 sliding in its groove 23. The grooves 23 are shorter than the guide rails 22 because the shuttle moves normally from the opening up to a distance from the opening of the vehicle equal to the width of a trolley. To reduce the pulling force exerted by the delivery man, a pulley-based gear-reduction system 26 is positioned at the strap 7. A blocking system 25 positioned on the axis of each groove 23 and in proximity to the opening of the vehicle keeps the strap 7 tensed and thus keeps the shuttle in contact with a trolley during transportation so as to block the row of trolleys. This blocking system 25 is for example a narrowed feature between two parts so that the strap is gripped therein, or it is a hook or cleat. The part of the strap that is situated after the blocking means is free and can advantageously be stowed in a box on the side of the vehicle. Depending on the number of wheel-fitted trolleys placed in the loading volume, the shuttle 6 is closer to or more distant from the opening. In moving the shuttle rearwards by pulling on the strap 7, the delivery man places the last trolley 10 as close as possible to the closed door against a fixed stopper. This fixed stopper is movable during the unloading onto the bay. In this way, the movements of the rows of trolleys are limited at the front by the shuttle and at the rear by said moveable stopper.

According to one improvement, the ramp 12 extends the floor of the vehicle up to the loading dock provided with a guiding means for the wheels of the trolleys 10. Rectangular structures 27 are attached to the ramp to create raised features, the sides of which come into contact with the wheels and which can thus guide them. The two opposite sides of the rectangle have a spacing between them that is slightly smaller than that between the wheels of the trolleys. At least one of the sides is situated in the extension of the profile of a guide rail 22 when the ramp is properly positioned in the rear of the vehicle. In this way, the delivery man can make the trolley with boxes on it move on the ramp so that the wheels get positioned on each side of the structure 27. Once the positioning has been done, the delivery man continues to push the stack of boxes towards the front of the vehicle and the front wheels of the trolley get engaged naturally in the guide rail, either to the right or to the left. Advantageously, the profile of the structure oriented towards the rear is no longer rectangular but beveled. Thus, a single wheel first of all comes into contact with the structure and follows its beveled profile and then, in continuing to move forward, the wheel on the other side comes into contact with the other side of the structure. In this case, a defect in the positioning of a trolley that comes to the loading point can be corrected naturally when it moves forward on the ramp and then into the loading volume.

The chilled compartment 21 is an isothermal box having walls 28 with a thickness of at least 5 cm. This thickness also exists on the floor, so that the floor of this compartment is situated at least 5 cm above the floor of the ambient-temperature compartment. To prevent the delivery man from having to use major force to raise a trolley transporting boxes, the part of the ramp 12 that faces the chilled compartment is tilted differently from the part of the ramp facing the ambient-temperature compartment. The boundary between these two parts is represented by the dotted line 28 that can be seen in FIG. 3.

FIG. 4 shows the ramp 12 in a profile view showing the details of the two slopes. The ramp has a first platform 30, one side of which lies on the loading dock 5 and the opposite side of which lies on the floor 31 of the chilled compartment. The ramp also has a second platform 32, one side of which lies on the loading dock 5 and the opposite side of which lies on the floor 33 of the ambient-temperature compartment. The ramp is preferably made out of thick sheet metal, each platform 30 and 32 is substantially rectangular and their link (symbolized by the line 29) is typically triangular. The difference in inclination between these two parts depends on the thickness of the isothermal wall and the length of the ramp. The ramp works with the rear of the vehicle to get positioned so that the structures 27 are situated in the extension of the guide rails 22. The other side of the ramp is positioned on the dock 5 on a surface allowing defects of alignment of the vehicle with the bay.

FIG. 5 shows the details of a ramp seen from the top in one exemplary embodiment. Oblong apertures 50 are cut out in the metal sheet in order to form handles, these handles being situated on the side that is placed on the platform. According to this example of an embodiment, the structural sections 27 designed to guide the wheels of the trolleys are right-angled corners soldered directly to the ramp, each row of trolleys having a single profile to guide either the right-hand wheels or the left-hand wheels of the trolley. The figure shows the two platforms, 30 and 31 separated by a triangular link 29 that links them mechanically.

FIG. 6 shows the details of a ramp seen in a three-quarter view according to the same embodiment. A raised edge 51 is disposed on each side of the ramp to prevent the trolleys from falling on the sides.

FIG. 7 shows a detailed view of the shuttle and the way in which it engages with the wheel-fitted trolleys. They shuttle 6 slides in the groove 21 seen in a transparent view and the trolley 10 runs on the floor 34 of the compartment. When the strap 7 is pulled, the vertical arm 35 of the shuttle abuts against the edge of the tray 36 of the trolley. The set formed by the shuttle and trolleys then moves in the direction shown by the arrows.

FIG. 8 shows the details of the stabilizer bars and the roof bars designed to block the boxes stored in the ambient-temperature compartment. The exemplary embodiment illustrated by FIG. 8 shows two rows of stacked boxes laid on trolleys 10 running in the guide rails 22. The boxes used have a lid that folds down to constitute a surface to support the box above it. The hinges of the lid extend beyond the lid heightwise and form a longitudinal sill extending along the length of the box. This longitudinal sill can be put to use by the lateral blocking system. To this end, the stabilizer bars 9 are attached to the left of the left-hand row and to the right of the right-hand row on the walls of the compartment. According to the exemplary embodiment illustrated, the stabilizer bars are constituted by lips extending towards the bottom and hooking the longitudinal sill of the boxes situated at a certain level. It is unnecessary to hold all the boxes, in this example, the second-level boxes and the fourth-level boxes are held by stabilizer bars. The stabilizer bars extend over the length of the compartment.

According to one improvement, this free space between the top box of the stack and the roof of the vehicle is used for the storage of the trolleys. Flat transportation bars 30 are disposed above the rows of trolleys and spaced out at a distance smaller than the width of the trolley and greater than the distance between the wheels of said tray. The transportation bars 30 that can receive as many trolleys as there are rows situated beneath comprise stoppers situated at the front and rear ends that hold the trolleys being transported. The delivery man removes the trolleys either from the rear or from the front by slightly lifting the trolleys to release them from said stoppers.

The transportation bars 30 in the middle are hooked to the ceiling by a vertical support that extends them downwards for the attachment of the roof bar 8. In the embodiment illustrated by FIG. 8, the roof bar is placed in the middle of the ambient-temperature compartment and attached at a height enabling the blocking of the boxes stacked on the third row, the one that straddles the right-hand row and the left-hand row of the compartment. As shall be seen here below, this row is mean for the empty boxes stacked on one another. The height between the roof bar and the floor is calculated so that it is greater, by about 1 cm, than a total value comprising the height of a trolley and at least a certain number of stacked boxes. In the exemplary embodiment shown, it is possible to stack 18 empty boxes beneath the roof bar.

According to one alternative embodiment illustrated in FIG. 9, the transportation bars 30 enable the storage of a single row of trolleys above the third row. The transportation bars 30 are hooked to the ceiling by two vertical supports which extend downwards for the attachment of two roof bars 8. According to this alternative embodiment, the two roof bars 8 are positioned above the right-hand and left-hand rows of trolleys and ensure the blockage of the boxes on these two rows. In this case, the height between the roof bars and the floor is calculated to be greater by about 1 cm than a total value comprising the height of a trolley and a certain number of stacked full boxes. In the exemplary embodiment shown, it is possible to stack five full boxes on top of one another.

According to one improvement, the roof bar 8 is mounted on at least two hinged tie-rods, the bar gets lowered and is positioned with the closing of the door of the vehicle. The bar 8 can be of a rack type to serve as a support for a catch or pawl installed on the holding structure of the first stack.

According to another improvement, the chilled compartment has a height smaller than that of the ambient-temperature compartment. This difference in height is advantageously used through the installation of a drawer above the chilled compartment. This drawer enables the storage of bags and small objects.

6.4 Description of a Mode of Loading the Vehicle

After the description of the different items of equipment of the vehicle of the invention, we shall now describe an example of a procedure for unloading boxes. This example of a procedure comprises the steps illustrated by FIGS. 10.*a*, 10.*b*, 10.*c*, 10.*d* and 10.*e*.

In this example, the driver's cabin is surmounted by a housing that is accessible from the loading volume and especially the ambient-temperature compartment. In this example, the vehicle has a door on the side enabling lateral access to the ambient-temperature compartment.

Each figure illustrates three points in time in a delivery, these points in time being represented by the states of the boxes in the compartment. The left-hand picture shows the state at the arrival of a delivery, the central picture shows the state of the boxes after the delivery man has removed those boxes that have to be delivered. The right-hand figure shows the state after the delivery man has retrieved the empty boxes and just before departure for the next delivery. The empty boxes coming from the ambient-temperature compartment are nested in one another and can constitute a stack of 17 boxes. 17 boxes stacked and nested together on trolley constitute a height slightly smaller than the height of the roof bar 8, thus blocking the stack during transportation and preventing it from tipping over in one direction or another. The empty boxes coming from the chilled compartment cannot be nested in one another. The position of the boxes represented by the right-hand image shows an optimum disposition in terms of holding, this state ensuring that the boxes will not tip over during transportation.

At the beginning of the step 10.*a* the vehicle 1 is filled with a maximum number of boxes. The ambient-temperature compartment has two rows of six trolleys, each trolley supporting a stack of five boxes, 60 boxes being therefore contained in the ambient-temperature compartment. The chilled compartment has a row of six trolleys, each trolley supporting a stack of four boxes, 24 boxes therefore being contained in the chilled compartment. During the step 10.*a*, the contents of a box of the chilled compartment and the contents of the four boxes of the ambient-temperature compartment, are delivered, the contents of four boxes ambient-temperature compartment situated in the right-hand row being delivered by priority. At the end of the step 10.*a*, the five empty boxes are stowed in the housing above the driver in making them pass through the side door.

At the beginning of the step 10.*b*, the delivery man has delivered a certain number of contents of a box and has moved the right-hand row of the ambient-temperature compartment by the length of one trolley. The place thus released in the front of this row enables the storage of three empty boxes. At the step 10.*b*, the contents of a box of the chilled compartment and the contents of two boxes of the ambient-temperature compartment are delivered. At the end of the step 10.*a*, the two empty boxes are stowed in the front of the right-hand row in making them pass through the side door.

At the beginning of the step 10.*c*, the delivery man has delivered a certain number of box contents and has moved the three rows by the length of one trolley. The space thus released in the front of the two rows enables the storage of 10 empty boxes. Eight of these empty boxes are stacked on the third row of the ambient-temperature compartment. These 8 empty boxes are secured by the two rows of full boxes. At a step 10.*b*, the contents of three boxes of the ambient-temperature compartment have been delivered and the right-hand row has moved forward by the length of one trolley. At the end of the step 10.*a*, the three empty boxes are stowed in front of the third row in making them pass through the side door.

At the beginning of the step 10.*b*, the right-hand and left-hand rows of the ambient-temperature compartment have moved forward by the length of two trolleys. The space thus released in front of the two rows is used to store two stacks of empty boxes on the third row of the ambient-temperature compartment. These two stacks of empty boxes are secured by the two rows of full boxes. At step 10.*d*, the contents of two boxes of the chilled compartment and the contents of five boxes of the ambient-temperature compartment are delivered. The contents of the boxes of the ambient-temperature compartment are extracted from the right-hand and left-hand rows and the right-hand row has moved forward by the length of one trolley. At the end of the step 10.*d*, the five empty boxes are stowed in the front of the third row in making them pass through the side door. The two stacks of empty boxes are secured by the left-hand row, thus preventing untimely tipping over.

At the beginning of the step 10.*e*, the right-hand and left-hand rows of the ambient-temperature compartment have moved forward by the length of three trolleys. The space thus released in the front of the two rows is used for the storage of three stacks of empty boxes on the third row of the ambient-temperature compartment. One stack concerns only boxes coming from the chilled compartment. Another stack reaches the maximum size, this stack is blocked especially by the roof bar. These three stacks of empty boxes are secured by the left-hand row of full boxes. In the step 10.*e*, the contents of the two boxes of the chilled compartment and the contents of three boxes of the ambient-temperature compartment are delivered. At the end of the step 10.*e*, the three free boxes are stowed in the front on the second stack of the third row. The delivery man therefore has a buffer zone which enables firstly the storage of the empty boxes and secondly, the sorting of boxes that are intended for the chilled compartment and of boxes intended for the ambient-temperature environment. In order to differentiate between these boxes more efficiently, the boxes intended for the chilled compartment are colored blue and the boxes intended for the ambient-temperature environment are colored green.

FIGS. 10.*a* to 10.*e* illustrate an unloading method where the stacks of boxes are extracted from the rear of the vehicle during delivery and where the empty boxes are placed in front of the vehicle through the side doors. In this way, the delivery man never climbs into the vehicle, thus facilitating his delivery job. At departure, the vehicle consists of a set of stacks of full boxes loaded from a bay and held automatically during transportation. Upon return from its rounds, the vehicle is constituted by a set of stacks of empty boxes held during transportation which can be easily unloaded from a bay.

6.5 Variants in the Organization of the Compartments of the Vehicle

According to one alternative embodiment illustrated by FIG. 11, the payload volume is divided into a plurality of compartments. In the example illustrated, the commercial vehicle 1 is equipped with three types of compartments placed at different temperatures; a compartment 40 kept at a deep-freezing temperature (−20° C.), compartment 41 kept at a chilled temperature (2-3° C.) and the rest 42 of the loading volume kept at ambient temperature, and possibly slightly refrigerated (for example 15° C.). The compartment 40 is surrounded by reinforced thermal insulation (for example a thickness of 60 mm foam) and an efficient high-performance isothermal door. It is positioned crosswise and accessible by the sliding side door 45 of the vehicle. The cold generator is placed above this compartment and against the partition separating the cabin from the loading zone. Free volume is left above the deep-freezing compartment 40 for the storage therein of boxes of fruit and vegetables for example, or trolleys or empty boxes. The compartment 41 is also surrounded by thermal insulation and provided with an isothermal door which preferably opens at the same time as the door of the vehicle. This arrangement of the compartments enables speedy loading and unloading of boxes, because of access from the rear for the essential part of the consignment. Narrow housings that extend heightwise are available at the point of passage of the wheels 43. These housings can receive empty trolley 17 and/or the ramp 12.

An exemplary embodiment of the present invention proposes a novel means for unloading packages between the loading volume of a vehicle and a loading and/or delivery dock or bay.

Although the present invention has been described with reference to particular embodiments illustrated, they are in no way limited by these embodiments nor by the appended drawings. It will be noted that changes or modifications can be made by those skilled man in the art.

The invention claimed is:

1. A vehicle for transporting boxes in a loading volume, said boxes being stacked on at least one trolley with wheels, wherein the vehicle comprises:
  at least one guide rail attached to the floor and engageable with the at least one trolley to guide movement of said trolley,
  at least one device exerting a horizontal force on a row of boxes placed on at least one trolley to move the row of boxes towards an opening of the vehicle;
  at least one roof bar holding, at an upper portion, at least one stack of boxes placed on a trolley;
  at least one stabilizer bar attached horizontally on the length of at least one internal wall of the loading volume, the boxes having at least one longitudinal sill extending on the side and on the top, the stabilizer bar hooking said sill by the top.

2. The vehicle according to claim 1, wherein the at least one roof bar is configured to block a stack of empty boxes nested within one another, the distance between the floor of the vehicle and said roof bar being slightly greater than the sum of the heights of a trolley and a determined number of empty boxes placed on top of one another.

3. The vehicle according to claim 1, wherein the boxes have a lid and the at least one roof bar is configured to block a stack of empty boxes placed on one another with the lid closed, the distance between the floor of the vehicle and said roof bar being slightly greater than the sum of the heights of a trolley and a determined number of empty boxes placed on top of one another with the lid closed.

4. The vehicle according to claim 1, wherein the boxes have a lid and the at least one stabilizer bar hooks the boxes placed on top of one another with the closed lid, the height of the stabilizer bar being situated at a height equal to the sum of the heights of a trolley and a determined number of boxes placed on top of one another with the lid closed.

5. The vehicle according to claim 1, wherein the device exerting a horizontal force on a row of boxes placed on at least one trolley comprises a mobile stopper sliding in a guide rail attached to the floor of the loading volume and coming into contact with a trolley or a box placed on the trolley, said mobile stopper moving by using a strap towards an opening of the vehicle.

6. The vehicle according to claim 5, wherein the vehicle comprises elements blocking said strap in proximity to the opening in order to keep the strap under tension along a direction longitudinal to the vehicle when said mobile stopper comes into contact with a trolley or a box placed on the trolley, which itself abuts against a fixed stopper present in proximity to the opening of the vehicle.

7. The vehicle according to claim 1, wherein the loading volume comprises at least two guide rails to guide the wheels either to the left or to the right of two rows of trolleys.

8. The vehicle according to claim 1, wherein the vehicle comprises an access ramp placed in a rear of the vehicle in order to extend a floor of the vehicle up to the loading bay, said access ramp comprising straight elements extending to the at least one guide rail present in the loading volume.

9. The vehicle according to claim 8, wherein the loading volume comprises two parts having floors at different heights, said access ramp being constituted by two platforms, each platform getting placed on each floor of the two parts of the loading volume and getting extended to get placed on the loading bay, the two platforms having different slopes to compensate for the difference in height between floors.

10. The vehicle according to claim 1, wherein the vehicle comprises a compartment at ambient temperature containing a plurality of rows of boxes, one chilled compartment containing a single row of boxes, said chilled compartment having a height lower than the height of the compartment at ambient temperature, and a drawer placed on top of the chilled compartment, the contents of which are accessible by pulling the drawer towards the rear of the vehicle.

11. A method comprising:
  unloading a vehicle transporting boxes in a loading volume, said boxes being stacked on at least one trolley with wheels, wherein the vehicle comprises:
    at least one guide rail attached to the floor and engageable with the at least one trolley to guide movement of said trolley;
    at least one device exerting a horizontal force on a row of boxes placed on at least one trolley to move the row of boxes towards an opening of the vehicle;
    at least one roof bar holding, at an upper portion, at least one stack of boxes placed on a trolley;
    at least one stabilizer bar attached horizontally on the length of at least one internal wall of the loading volume, the boxes having at least one longitudinal sill extending on the side and on the top, the stabilizer bar hooking said sill by the top; and
    a rear door giving access to a rear of the row of boxes and a lateral door giving access to a front of the rows of boxes,
  wherein unloading comprises unloading at least one stack of full boxes through the rear of the vehicle, moving at least one row of boxes towards the rear by at least the length of a stack and introducing empty boxes through the side door to place them at the position thus released in front of the moved row.

12. The method for unloading a vehicle according to claim 11, wherein the empty boxes are nested into one another, forming a stack having a number of boxes at least equal to twice the number of full boxes in a stack, the row of empty boxes being placed so that the row straddles the guide rails of two rows of full boxes and the stacks of empty boxes being held by the roof bar.

* * * * *